United States Patent [19]

Hall

[11] 4,260,169
[45] Apr. 7, 1981

[54] KEYLESS CHUCK

[76] Inventor: Robert L. Hall, 1770 Brookside Dr., Germantown, Tenn. 38138

[21] Appl. No.: 98,661

[22] Filed: Nov. 29, 1979

[51] Int. Cl.³ .......................... B25B 13/44; B23B 31/06
[52] U.S. Cl. .................................... 279/62; 74/750 R; 279/64
[58] Field of Search ................... 279/1 A, 1 B, 56, 60, 279/61, 62, 64; 74/750 R

[56] References Cited
U.S. PATENT DOCUMENTS

| | | | |
|---|---|---|---|
| 913,059 | 2/1909 | Savage | 279/62 |
| 2,684,856 | 7/1954 | Stoner | 279/61 |
| 3,974,718 | 8/1976 | Kylberg | 74/750 R |

Primary Examiner—Robert D. Baldwin
Attorney, Agent, or Firm—Walker & McKenzie

[57] ABSTRACT

A keyless chuck for attaching a drill bit to the rotary shaft of a drill. A sun gear is fixed to the rotary shaft and coacts with a set of planetary gears to rotate a body member having a plurality of threaded jaw members movably attached thereto. A screw ring member coacts with the jaw members to selectively cause the jaw member to open and close when the jaw members rotate relative to the screw ring member. A ring gear member is attached to the screw ring member and coacts with the planetary gears to allow the screw ring member to normally rotate with the jaw members unless substantial resistance is applied to the ring gear member to hinder its rotation.

11 Claims, 15 Drawing Figures

KEYLESS CHUCK

BACKGROUND OF THE INVENTION

1. Field of the Invention

This invention relates in general to rotary tool chucks and more specifically to keyless drill chucks for attaching drill bits to the rotary shaft of a drill.

2. Description of the Prior Art

Heretofore, various rotary tool chucks have been developed. See, for example, Church, U.S. Pat. No. 928,180; Bodmer, U.S. Pat. No. 1,132,550; Prigan, U.S. Pat. No. 1,750,023; Stoner, U.S. Pat. No. 2,042,197; Tautz, U.S. Pat. No. 2,055,916; McCombs, U.S. Pat. No. 2,368,858; Thomas, U.S. Pat. No. 2,404,006; Rohm, U.S. Pat. No. 3,244,428; Rohm, U.S. Pat. No. 3,795,406; and Bent, U.S. Pat. No. 3,807,745. None of the above patents disclose or suggest the present invention.

SUMMARY OF THE INVENTION

The present invention is directed towards improving upon prior rotary tool chucks and the like. One object of the present invention is to provide a rotary tool chuck which will attach or release a tool to or from a rotating shaft when the user thereof grasps a portion of the outer surface of the head to hinder rotation thereof. Another object of the present invention is to provide such a rotary tool chuck which includes a chuck means attached to the rotary shaft by way of a gear train and which will cause the speed of rotation of the chuck means to decline when a portion of the outer surface of the head is grasped by the user to hinder rotation thereof. A further object of the present invention is to provide such a rotary tool chuck which will increase the locking power if the tool held therein encounters difficulty in rotating, which also reduces slipage damage to the tool, and which will lock the tool in the tool head much tighter than can be done by the use of the hands alone or with a chuck key.

The keyless chuck of the present invention includes, in general, a sun gear attached to the rotary shaft of a drive motor for rotation therewith; planetary gear means associated with the sun gear; the planetary gear means including a gear plate for rotation with the sun gear; chuck means including a body member attached to the gear plate for rotation therewith, and including a plurality of threaded jaw members movably attached to the body member for rotation therewith, and including a screw ring gear associated with the jaw members, rotation of the jaw members relative to the screw ring member causing the jaw members to open and close; and ring gear means attached to the screw ring member and associated with the planetary gear means for preventing the screw ring member from rotating with the body member when substantial resistance is applied to the ring gear means to hinder rotation thereof.

DESCRIPTION OF THE PREFERRED EMBODIMENTS

Figure 1:
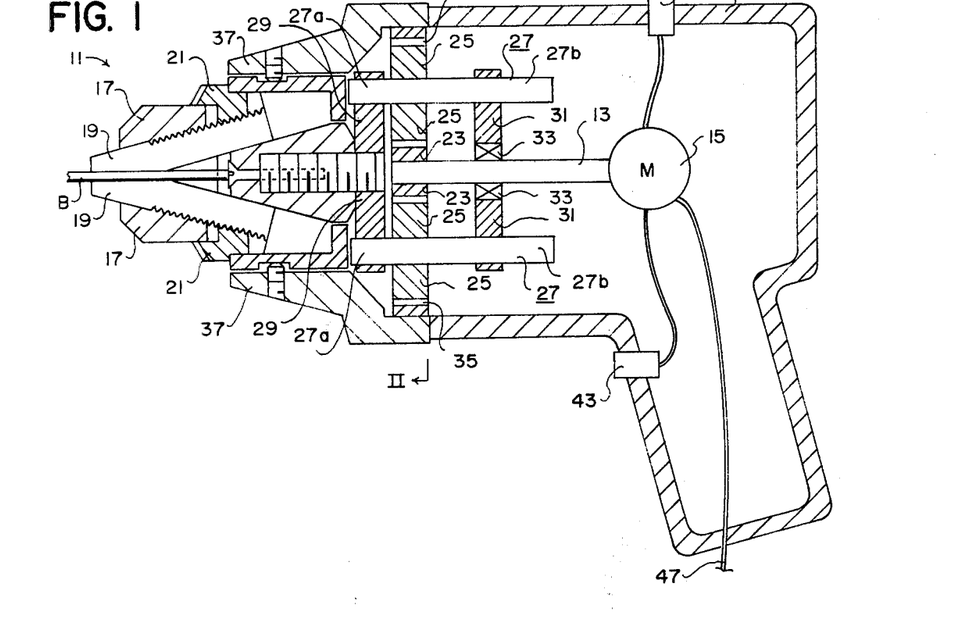
FIG. 1 is a somewhat diagrammatic sectional view of a portable electric hand drill incorporating a first embodiment of the present invention and shown with a drill bit mounted thereon.
Figure 2:
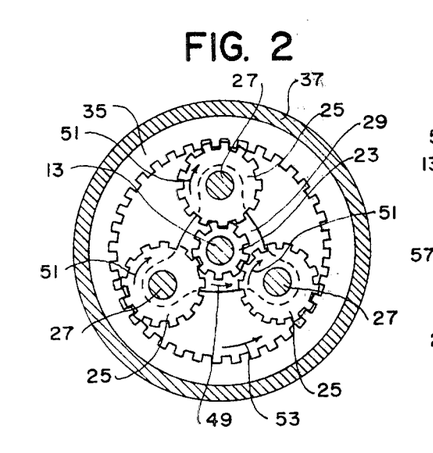
FIG. 2 is a sectional view taken on line II—II of FIG. 1.
Figure 3:
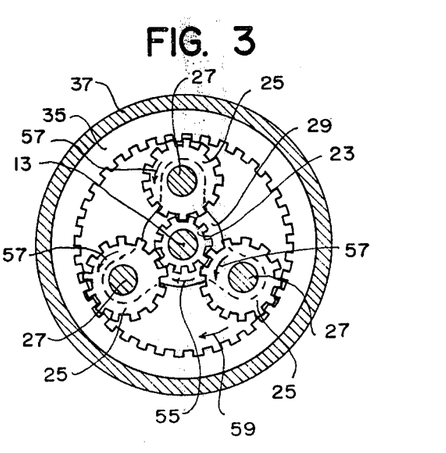
FIG. 3 is a sectional view substantially similar to FIG. 2.
Figure 4:
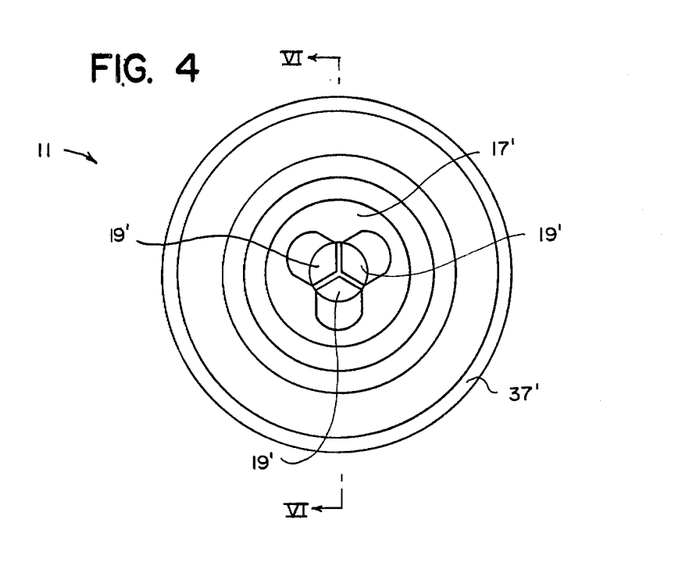
FIG. 4 is a front elevational view of a second embodiment of the present invention.
Figure 5:
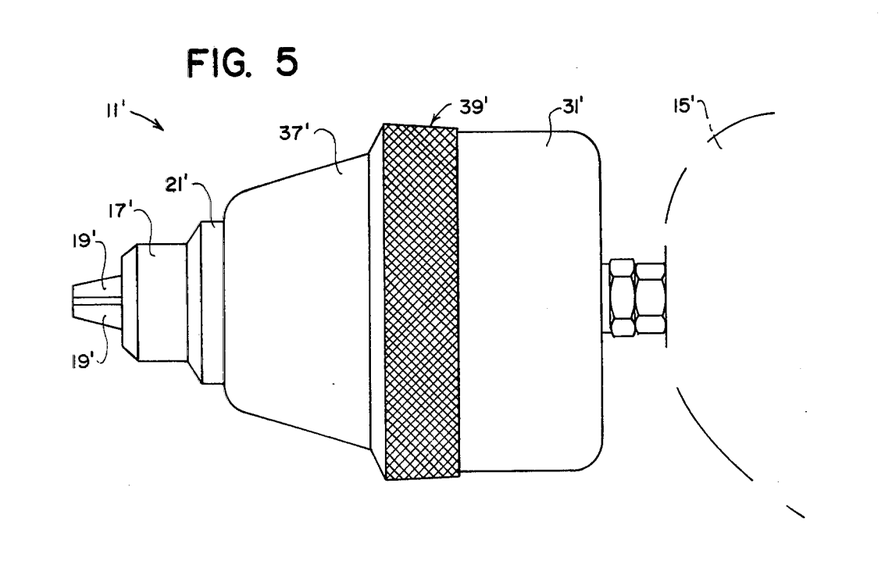
FIG. 5 is a side elevational view thereof with portions of a standard portable hand drill shown in broken lines.

A first embodiment of the present invention is somewhat diagrammatically shown in FIGS. 1, 2 and 3. In this embodiment, an improved keyless drill chuck 11 is associated with a rotary shaft 13 of a drive motor 15 whereby the drill chuck 11 is rotated by the drive motor 15 to allow a drill bit B held by the drill chuck 11 to be rotated by the drive motor 15.

The drill chuck 11 includes a body member 17 for being rotatably associated with the rotary shaft 13 of the drive motor 15, includes a plurality of threaded jaw members 19 movably attached to the body member 17 for rotation therewith, and includes a screw ring member 21 associated with the jaw members 19 for normally rotating with the jaw members 19. The body member 17, jaw members 19 and screw ring member 21 may be constructed substantially identical to the typical key-type drill chuck whose construction with operation will be apparent to those skilled in the art. Church, U.S. Pat. No. 928,180 discloses one type of such a key-type drill chuck. In general, rotation of the jaw members 19 and screw ring member 21 relative to one another causes the jaw members 19 to open and close as will be apparent to those skilled in the art. Thus, in a normal, nonimproved key-type drill chuck, a key is utilized to cause the screw ring member 21 to rotate about the jaw members 19 to cause the jaw members 19 to slide back and forth relative to the body member at an angle whereby a drill bit B can be fixedly attached thereto or released therefrom as will be apparent to those skilled in the art. The improvement of the present invention modifies the standard key-type drill chuck so that the jaw members 19 can be moved relative to the body member 17 without utilizing such a key.

The improvement of the present invention includes a sun or spur gear 23 for being fixedly attached to the rotary shaft 13 of the drive motor 15 for rotation therewith. The sun gear 23 may be fixedly attached to the rotary shaft 13 in any manner apparent to those skilled in the art such as, for example, by being screwed or keyed thereto (not shown) as will be apparent to those skilled in the art.

The improvement of the present invention includes a planetary gear means associated with the sun gear 23 for transferring rotary motion from the sun gear 23 to the body member 17. The planetary gear means includes at least one and preferably two or three planetary gear members 25 for being attached to the body member 17 and for engaging the sun gear 23. Each planetary gear member 25 is preferably rotatably mounted on a shaft member 27. A first end 27a of each shaft member 27 is preferably fixedly attached to a plate member 29 which is in turn fixedly attached to the body member 17 in any manner apparent to those skilled in the art such as by way of screws or the like (not shown). A second end 27b of each shaft member 27 is preferably rotatably supported relative to the rotary shaft 13 of the drive motor 15 in any manner apparent to those skilled in the art. For example, the second end 27b of each shaft member 27 may be attached to a plate member 31 which is in turn rotatably supported on the rotary shaft 13 by way of a bearing member 33.

The improvement of the present invention includes a ring gear means associated with the planetary gear means for being attached to the screw ring member 21 and for preventing the screw ring member 21 from rotating with the jaw members 19 when substantial resistance is applied to the ring gear means to hinder rotation thereof. The ring gear means preferably includes a ring gear member 35 associated with each planetary gear member 25. The ring gear means also preferably includes a casing member 37 fixedly attached to the ring gear member 35 and to the screw ring member 21 to cause the screw ring member 21 to rotate the ring gear member 35. The screw ring member 21 and ring gear member 35 may be fixedly attached to the casing member 37 in any manner apparent to those skilled in the art such as by way of screws or the like (not shown). At least a portion of the outer surface of the casing member 37 may be knurled (not shown) to provide a firm hand grip for allowing substantial resistance to be applied thereto to hinder rotation of the ring gear member 35.

The direction of rotation of the rotary shaft 13 of the drive motor 15 is preferably reversible. For example, the drive motor 15 preferably has a switch means 41 for electrically reversing the direction of rotation of the rotary shaft 13 in a manner as will be apparent to those skilled in the art. The drive motor 15 also preferably has a switch means 43 for varying the speed of rotation of the rotary shaft 13 in a manner as will be apparent to those skilled in the art. A casing member 45 preferably encloses the drive motor 15 and at least a portion of the rotary shaft 13. The casing member 45 may be in the general shape of a typical, portable hand drill or the like. The drive motor 15 is coupled to a source of power for causing the rotary shaft 13 of the drive motor 15 to rotate. For example, an electrical cord 47 may extend from the drive motor 15 to allow the drive motor 15 to be selectively coupled to a source of electrical current as will now be apparent to those skilled in the art.

The operation of the keyless chuck 11 is as follows: To open the jaw members 19 to allow a drill bit B to be inserted therein or removed therefrom, the switch member 41 is placed in a position to cause the rotary shaft 13 to rotate in a reverse or counterclockwise direction, the casing member 37 is gripped so as to prevent rotation thereof, and the switch means 43 is moved so as to cause the rotary shaft 13 and sun gear 23 to slowly rotate in a reverse or counterclockwise direction as indicated by the arrow 49 in FIG. 2. The sun gear 23 will then cause the planetary gear members 25 to rotate about the shaft members 27 in a forward or clockwise direction as indicated by the arrows 51 in FIG. 2 while causing the plate member 29, shaft members 27 and gear members 25 to rotate as a unit in a reverse or counterclockwise direction as indicated by the arrow 53 in FIG. 2 whereby the body member 17 is caused to rotate in a reverse or counterclockwise direction as should now be apparent to those skilled in the art. This causes the jaw members 19 to rotate relative to the screw ring members 21 in a reverse or counterclockwise direction thereby causing the jaw members 19 to move rearwardly in the body member 17 whereby the jaw members 19 open relative to one another. Once the jaw members 19 have opened a sufficient amount, the switch means 43 is released causing rotation of the rotary shaft 13 to stop. A drill bit B can then be placed in or removed from the body member 17 between the jaw members 19 as will be apparent to those skilled in the art. To close the jaw members 19 about a drill bit B that has been placed in the body member 17 between the jaw members 19, the switch member 41 is placed in a position to cause the rotary shaft 13 to rotate in a forward or clockwise direction, the casing member 37 is again gripped so as to prevent rotation thereof, and the switch means 43 is moved so as to cause the rotary shaft 13 and sun gear 23 to slowly rotate in a forward or clockwise direction as indicated by the arrow 55 in FIG. 3. This causes the planetary gear members 25 to rotate about the shaft members 27 in a reverse or counterclockwise direction as indicated by the arrows 57 in FIG. 3 while causing the planetary gear members 25, the shaft members 27 and the plate member 29 to rotate as a unit about the sun gear 23 in a forward or clockwise direction as indicated by the arrow 59 in FIG. 3 whereby the body member 17 is rotated in a forward or clockwise direction as should now be apparent to those skilled in the art. This causes the jaw members 19 to rotate relative to the screw ring member 21 in a forward or clockwise direction whereby the jaw members 19 are moved forward in the body member 17 to close about the drill bit B. It should be noted that the drill bit B may be lightly held between the forefinger and thumb of one hand with the casing member 37 firmly held by the other fingers and palm of that hand with the other hand holding the casing member 45 and controlling the switch means 43 until the jaw members 19 grip the drill bit B at which time the forefinger and thumb release the drill bit B. The speed of rotation of the body member 17 will be less than the speed of rotation of the rotary shaft 13 when the casing member 37 is prevented from rotating by an amount proportional to the ratio of the sun gear 23, planetary gear members 25, and ring gear member 35 as will now be apparent to those skilled in the art. The unit can then be used as a drill by merely moving the switch means 43 to cause the rotary shaft 13 to rotate. With no resistance applied to the casing member 37 to hinder rotation thereof, rotation of the rotary shaft 13 and sun gear 23 will cause the planetary members 25, plate member 29, ring gear member 35, casing member 37, body member 17 and screw ring member 21 to rotate as a unit as should now be apparent to those skilled in the art.

A second embodiment of the present invention is shown in FIGS. 4, 5, 6, 7, 8 and 9. In this embodiment, an improved keyless drill chuck 11' is attached to the rotary shaft 13' of a standard portable hand drill 15' in place of the standard key-type drill chuck whereby a drill bit B' mounted in the drill chuck 11' can be rotated by the hand drill 15'. The basic construction and operation of the drill chuck 11' is substantially the same as the drill chuck 11 and reference should be made to the above description thereof.

Figure 6:
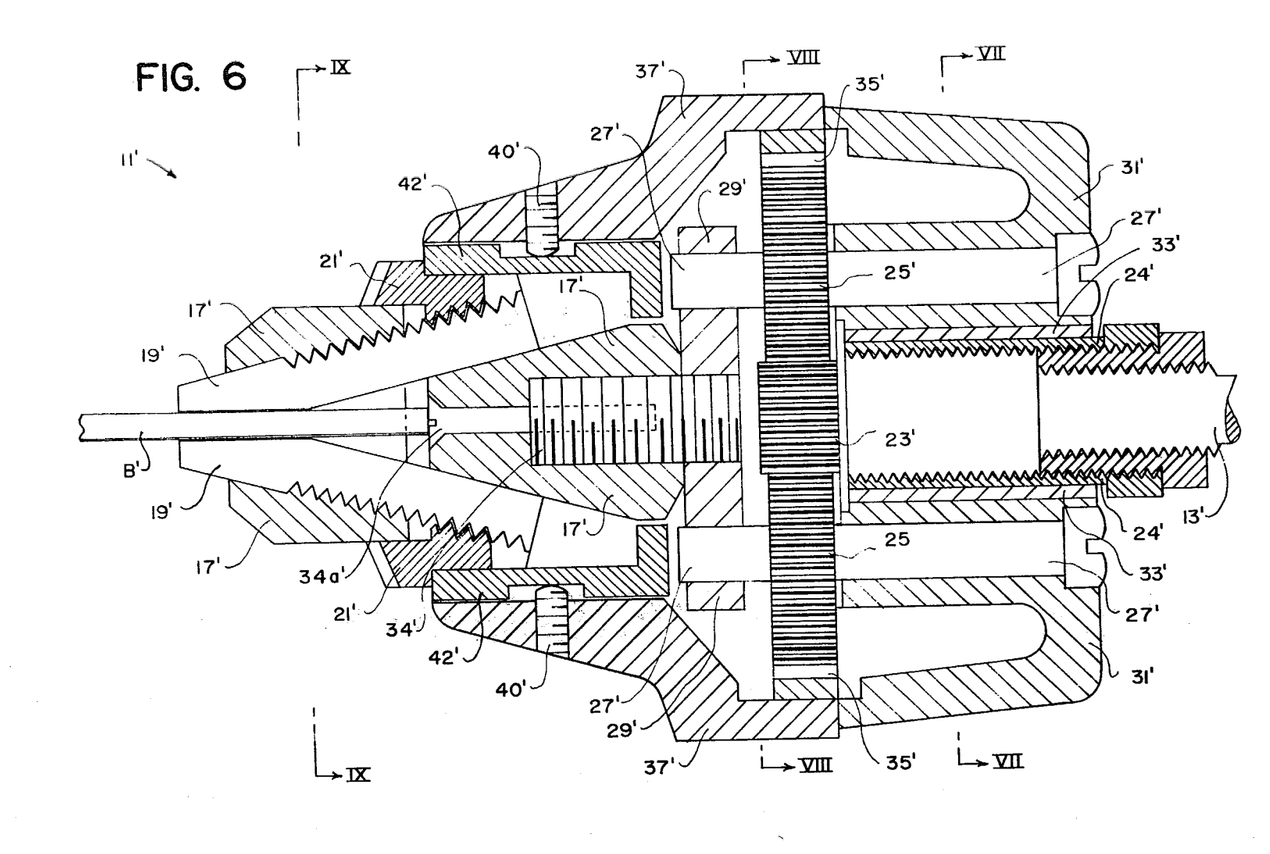
FIG. 6 is a sectional view as taken on line VI—VI of FIG. 4.
Figure 7:
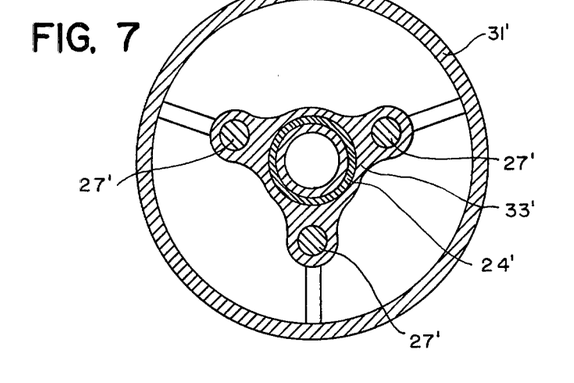
FIG. 7 is a sectional view as taken on line VII—VII of FIG. 6.
Figure 8:
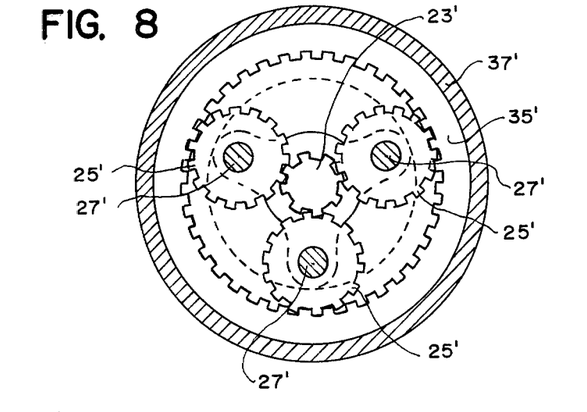
FIG. 8 is a sectional view as taken on line VIII—VIII of FIG. 6.
Figure 9:
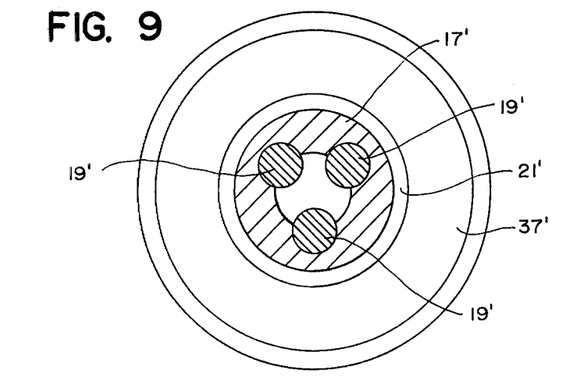
FIG. 9 is a sectional view as taken on line IX—IX of FIG. 6.
Figure 10:
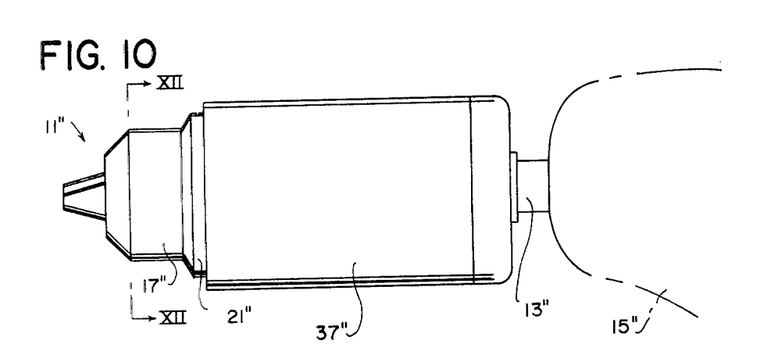
FIG. 10 is a side elevational view of a third embodiment of the present invention with portions of a standard portable hand drill shown in broken lines.
Figure 11:
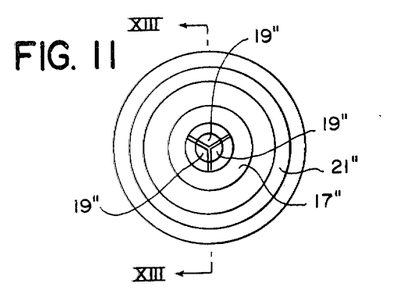
FIG. 11 is a front elevational view thereof.
Figure 12:
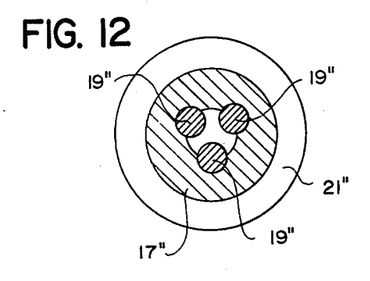
FIG. 12 is a sectional view as taken on line XII—XII of FIG. 10.

The drill chuck 11' includes a body member 17' for being rotatably associated with the rotary shaft 13', includes a plurality of threaded jaw members 19' movably attached to the body member 17' for rotation therewith, and includes a screw ring member 21' associated with the jaw members 19' for normally rotating with the jaw members 19'. The construction and operation of the body member 17', jaw members 19', and screw ring member 21' may be substantially the same as heretofore described relative to the body member 17, jaw members 19, and screw ring member 21 of the first embodiment and the above description will suffice.

The drill chuck 11' includes a sun or spur gear 23' for attachment to the rotary shaft 13' and for rotation therewith. The sun gear 23' may be attached to the rotary shaft 13' in any manner apparent to those skilled in the art. For example, the sun gear 23' may include an internally threaded boss portion 24' for being screwed onto the normally externally threaded outer end of the rotary shaft 13'. Lock nuts and the like (see FIGS. 5 and 6) may be used to insure that the sun gear 23' is not unintentionally removed or released from the rotary shaft 13'.

The drill chuck 11' includes a planetary gear means including a plurality of planetary gear members 25', a plurality of shaft members 27', a plate member 29' and a casing-like plate member 31' rotatably supported on the boss portion 24' of the sun gear 23' by way of a bearing member 33' or the like. The body member 17' is attached to the plate member 29' in any manner apparent to those skilled in the art such as by way of a threaded stud member 34'. A lock screw 34a' may be used to lock the body member 17' to the stud member 34'. The plate member 31' may be in the form of a casing member as clearly shown in FIG. 6.

The drill chuck 11' includes a ring gear means. The ring gear means includes a ring gear member 35' and a casing member 37' for allowing the ring gear member 35' to be fixedly attached to the screw ring member 21'. At least a portion of the outer surface of the casing member 37' may be knurled. The ring gear member 35' and the screw ring member 21' may be fixedly attached to the casing member 37' in any manner apparent to those skilled in the art such as by way of screws or the like. For example, screws 40' may extend through the casing member 37' and against an inner casing member 42' to fixedly attach the casing member 37' to the inner casing member 42'. The inner casing 42' is in turn fixedly attached to the screw ring member 21' by way of a friction fit or the like.

The operation of the drill chuck 11' is identical to the operation of the drill chuck 11 and the above description of the operation of the drill chuck 11 will suffice.

A third embodiment of the present invention is shown in FIGS. 10-15. In this embodiment, an improved keyless drill chuck 11" is attached to the rotary shaft 13" of a standard portable hand drill 15" in place of the standard key type drill chuck whereby a drill bit B" mounted in the drill chuck 11" can be rotated by the hand drill 15". The basic construction and operation of the drill chuck 11" is substantially the same as the drill chuck 11" and reference should be made to the above description thereof.

Figure 13:
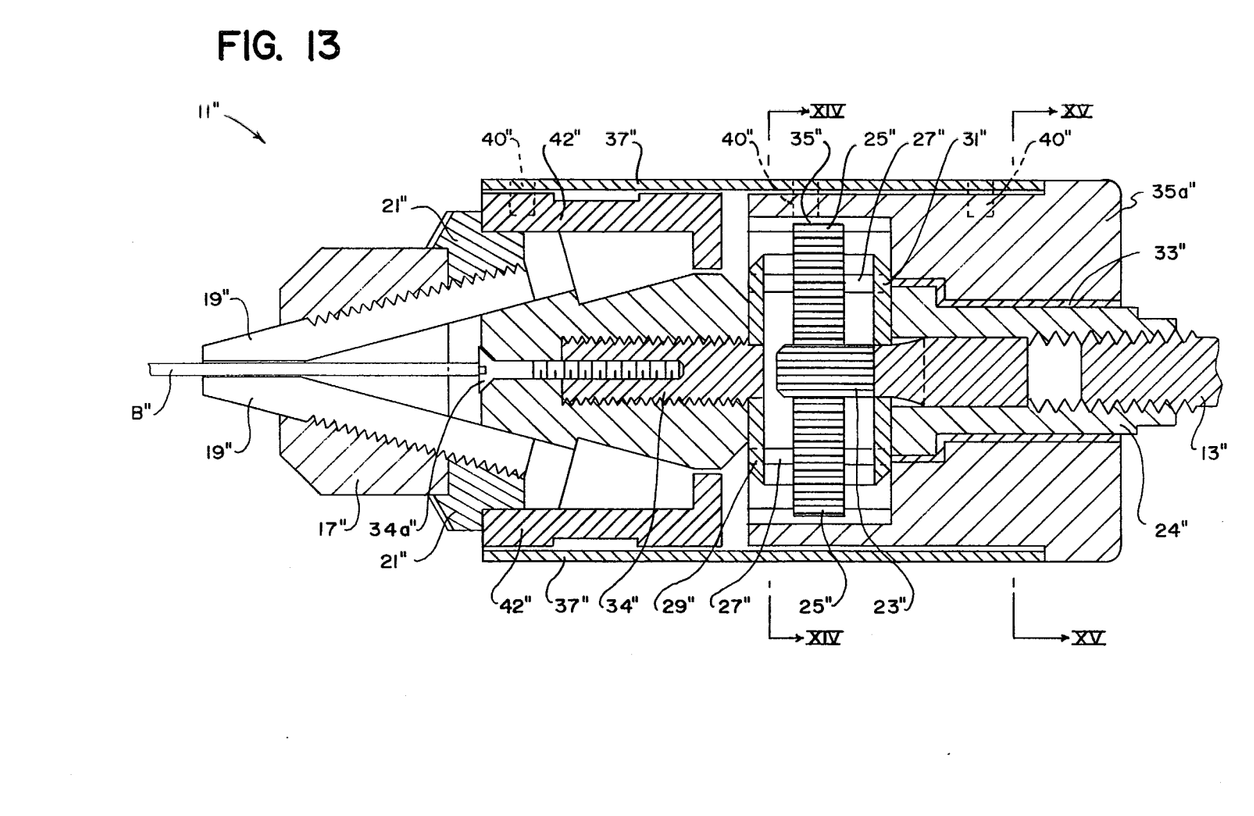
FIG. 13 is a sectional view as taken on line XIII—XIII of FIG. 11.
Figure 14:
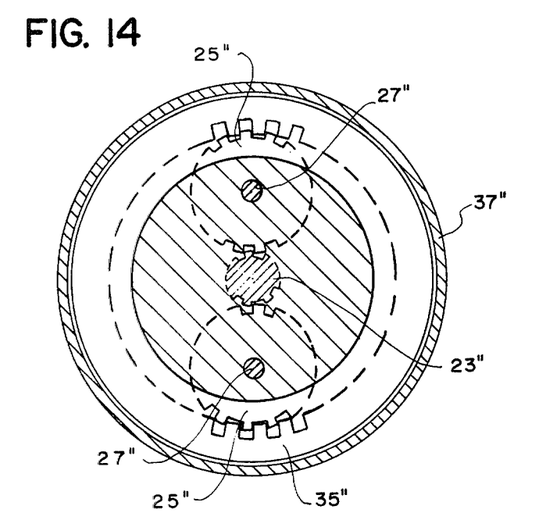
FIG. 14 is a sectional view as taken on line XIV—XIV of FIG. 13.
Figure 15:
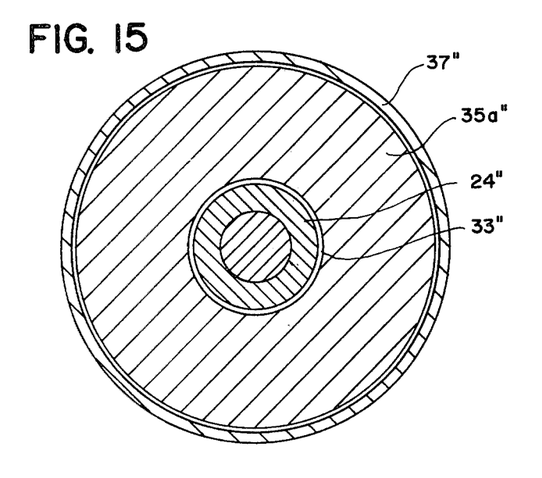
FIG. 15 is a sectional view as taken on line XV—XV of FIG. 13.

The drill chuck 11" includes a body member 17" for being rotatably associated with the rotary shaft 13", includes a plurality of threaded jaw members 19" movably attached to the body member 17" for rotation therewith, and includes a screw ring member 21" associated with the jaw members 19" for normally rotating with the jaw members 19". The construction and operation of the body member 17", jaw members 19", and screw ring member 21" may be substantially the same as heretofore described relative to the body member 17', jaw members 19', and screw ring member 21' of the second embodiment and the above description will suffice.

The drill chuck 11" includes a sun or spur gear 23" for attachment to the rotary shaft 13" and for rotation therewith. The sun gear 23" may be attached to the rotary shaft 13" in any manner apparent to those skilled in the art. For example, the sun gear 23" may be attached to, by way of a press fit or the like, threaded member 24" which is, in turn, screwed onto the normally externally threaded outer end of the rotary shaft 13".

The drill chuck 11" includes a planetary gear means including a pair of planetary gear members 25", a pair of shaft members 27", a first plate member 29" and a second plate member 31" joined to one another as shown in FIG. 13 with the gear members 25" engaging the sun gear 23". The body member 17" is attached to the plate member 29" in any manner apparent to those skilled in the art such as by way of a threaded boss portion 34" that is an integral part of the plate member 29" and that is screwed into the body member 17". A lock screw 34a" may be used to lock the body member 17" to the boss portion 34".

The drill chuck 11" includes a ring gear means. The ring gear means includes a ring gear member 35" and a relatively thin casing member 37" for allowing the ring gear member 35" to be fixedly attached to the screw ring member 21". The ring gear member 35" and the screw ring member 21" may be fixedly attached to the casing member 37" in any manner apparent to those skilled in the art such as by way of screws or the like. For example, screws 40" may extend through the casing member 37" and against an inner casing member 42" to fixedly attach the casing member 37" to the inner casing member 42". The inner casing 42" is in turn fixedly attached to the screw ring member 21" by way of a friction fit or the like. Additional screws 40" may extend through the casing member 37" and against a portion of the ring gear member 35" to fixedly attach the casing member 35" together. The ring gear means may include a rear casing member 35a" fixedly attached to the ring gear member 35" and rotatably supported on the member 24" by way of a bearing member 33" or the like. Additional screws 40" may extend through the casing member 37" and against a portion of the rear casing member 35a" to fixedly attach the casing member 37" and the rear casing member 35a" together.

The operation of the drill chuck 11" is identical to the operation of the drill chuck 11' and the above description of the operation of the drill chuck 11" will suffice. It will be noted that the specific construction of the drill chuck 11" provides a relatively compact unit.

Although the invention has been described and illustrated with respect to preferred embodiments thereof, it is not to be so limited since changes and modifications may be made therein which are within the full intended scope of the invention.

I claim:

1. An improved drill chuck of the type including a body member for being rotatably associated with a rotary shaft of a drive motor, including a plurality of threaded jaw members movably attached to said body member for rotation therewith, and including a screw ring member associated with said jaw members for normally rotating with said jaw members, rotation of said jaw members relative to said screw ring member causing said jaw members to open and close, wherein the improvement comprises:

(a) a sun gear for being attached to said rotary shaft of said drive motor for rotation therewith;
   (b) planetary gear means associated with said sun gear, said planetary gear means including a planetary gear member for being attached to said body member and for rotation with said sun gear to cause said body member to rotate; and
   (c) ring gear means associated with said planetary gear means for being attached to said screw ring member and for preventing said screw ring member from rotating with said jaw members when substantial resistance is applied to said ring gear means to hinder rotation thereof.

2. A keyless chuck for use with a drive motor having a rotary shaft, said chuck comprising:

(a) a sun gear for being attached to the rotary shaft for rotation therewith;
   (b) planetary gear means associated with said sun gear, said planetary gear means including a planetary gear member for rotation with said sun gear;
   (c) chuck means including a body member attached to said planetary gear member for rotation therewith, a plurality of threaded jaw members movably attached to said body member for rotation therewith, and a screw ring member associated with said jaw members for normally rotating with said jaw members, rotation of said jaw members relative to said screw ring members causing said jaw members to open and close; and
   (d) ring gear means attached to said screw ring member and associated with said planetary gear means for preventing said screw ring member from rotating with said jaw members when substantial resistance is applied to said ring gear means to hinder rotation thereof.

3. The chuck of claim 2 in which said ring gear means includes a ring gear member and in which said planetary gear means includes a plurality of planetary gear members for engaging said sun gear and said ring gear member, each of said planetary gear members being attached to said body member of said chuck means.

4. The chuck of claim 3 in which said ring gear means includes a casing member fixedly attached to said ring gear member and to said screw ring member of said chuck means, said casing member having an outer surface, said outer surface of said casing member being knurled to provide a firm grip for allowing substantial resistance to be applied thereto to hinder rotation to said ring gear member.

5. The chuck of claim 4 in which said planetary gear means is rotatably supported relative to the rotary shaft of the drive motor.

6. The chuck of claim 3 in which the speed of rotation of said body member is reduced when substantial force is applied to said ring gear means to hinder rotation thereof.

7. A drill comprising:

(a) a drive motor having a rotary shaft;
   (b) a sun gear attached to said rotary shaft for rotation therewith;
   (c) planetary gear means associated with said sun gear, said planetary gear means including a planetary gear member for rotation with said sun gear;
   (d) chuck means including a body member attached to said planetary gear member of said planetary means for rotation therewith, including a plurality of threaded jaw members movably attached to said body member for rotation therewith, and including a screw ring gear associated with said jaw members for normally rotating with said jaw members, rotation of said jaw members relative to said screw jaw member causing said jaw members to open and close; and
   (e) ring gear means attached to said screw ring member and associated with said planetary gear means for preventing said screw ring member from rotating with said body member when substantial resistance is applied to said ring gear means to hinder rotation thereof.

8. The drill of claim 7 which said ring gear means includes a ring gear member, in which said planetary gear means includes a plurality of planetary gear members for engaging said sun gear and said ring gear member, each of said planetary gear members being attached to said body member of said chuck means.

9. The drill of claim 8 in which said ring gear means includes a casing member fixedly attached to said ring gear member and to said screw ring member of said chuck means, said casing member having an outer surface, said outer surface of said casing member being knurled to provide a firm grip for allowing substantial resistance to be applied thereto to hinder rotation of said ring gear member.

10. The drill of claim 9 in which said planetary gear means is rotatably supported on the rotary shaft of the drive motor.

11. The drill of claim 8 in which the speed of rotation of said body member is reduced when substantial force is applied to said ring gear means to hinder rotation thereof.

* * * * *